(12) United States Patent
Brawner

(10) Patent No.: US 7,431,400 B2
(45) Date of Patent: Oct. 7, 2008

(54) TILTING MECHANISM FOR AUTOMOBILE HEADRESTS

(75) Inventor: Jeffrey Brawner, Tampa, FL (US)

(73) Assignee: Christopher J. Vitito, Celebration, FL (US)

( * ) Notice: Subject to any disclaimer, the term of this patent is extended or adjusted under 35 U.S.C. 154(b) by 187 days.

(21) Appl. No.: 11/477,507

(22) Filed: Jun. 30, 2006

(65) Prior Publication Data
US 2007/0170766 A1 Jul. 26, 2007

Related U.S. Application Data

(60) Provisional application No. 60/760,410, filed on Jan. 20, 2006.

(51) Int. Cl.
*A47C 1/036* (2006.01)
(52) U.S. Cl. .................. 297/408; 297/403; 297/409; 297/391
(58) Field of Classification Search ............. 297/408, 297/403, 409
See application file for complete search history.

(56) References Cited

U.S. PATENT DOCUMENTS

| 5,288,129 | A | * | 2/1994 | Nemoto | ............ 297/410 |
| 6,068,337 | A | * | 5/2000 | De Filippo | ............ 297/391 |
| 6,910,740 | B2 | * | 6/2005 | Baker et al. | ............ 297/408 |

* cited by examiner

*Primary Examiner*—J. Allen Shriver
*Assistant Examiner*—Philip S Kwon
(74) *Attorney, Agent, or Firm*—Welsh & Flaxman LLC

(57) ABSTRACT

An adjustable headrest for a vehicle includes a headrest body and at least one support arm extending downwardly from the headrest body. The support arm is shaped and dimensioned for positioning within the seat back of an automobile. A tilt assembly is positioned within the headrest body. The tilt assembly couples the headrest body to the support arm in a manner permitting relative movement between the headrest body and the support arm. The tilt assembly includes a lower bracket assembly fixedly coupled to the support arm and an upper bracket assembly fixedly coupled to the headrest body. The upper bracket assembly is pivotally coupled to the lower bracket assembly for controlled movement relative thereto. The tilt assembly includes a cam arm permitting actuation thereof between a locked position and a release position, wherein the cam arm may be actuated from either side of the headrest body.

17 Claims, 4 Drawing Sheets

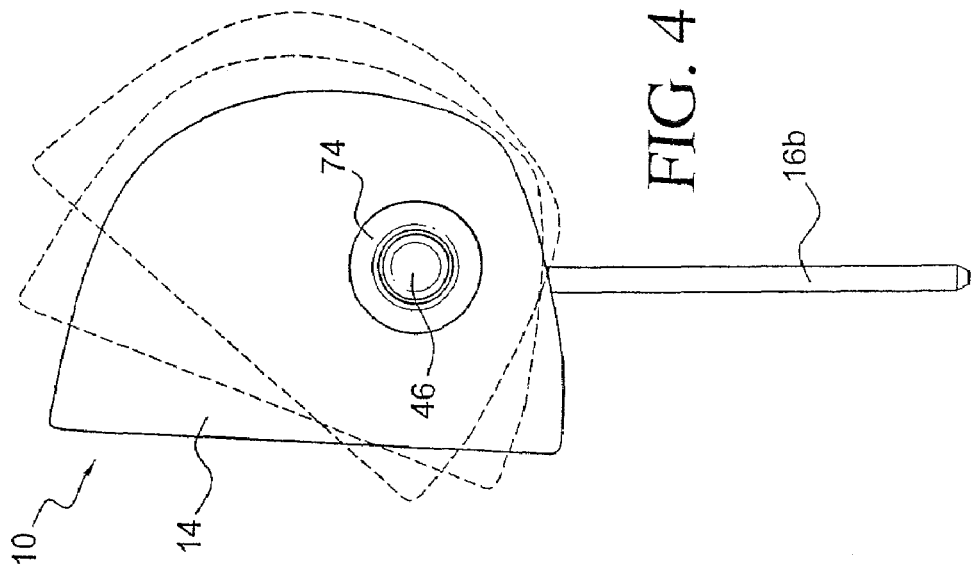
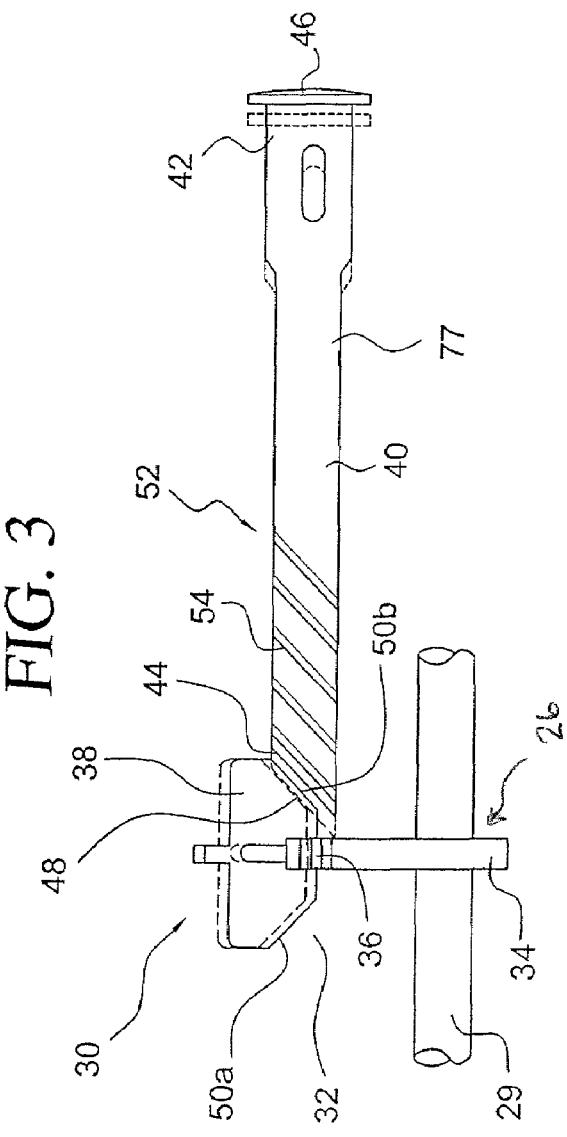

TILTING MECHANISM FOR AUTOMOBILE HEADRESTS

CROSS REFERENCE TO RELATED APPLICATION

This application claims the benefit of U.S. Provision Application Ser. No. 60/760,410, filed Jan. 20, 2006, entitled "TILTING MECHANISM FOR AUTOMOBILE HEADRESTS".

BACKGROUND OF THE INVENTION

1. Field of the Invention

The invention relates to automobile headrests. More particularly, the invention relates to a tilting mechanism for an automobile headrest.

2. Description of the Prior Art

Among the many features recently developed for enhancing the safety and comfort of automobile passengers and drivers adjustable headrests have been developed. Early headrests were limited in their usefulness and generally consisted of a covered block of foam extending from the upper portion of a seat back. The adjustment of these headrests was limited to vertical adjustment adapted to accommodate drivers and/or passengers of different sizes.

However, as we have learned more about ergonomics this knowledge has been rapidly applied to the development of safer and more comfortable automobile seats. Included among the advancements to automobile seats are improved headrests offering improved adjustability, resulting in enhanced user comfort. The present invention attempts to add to these refinements by providing an automobile headrest with an improved tilting mechanism designed for actuation from either side of the headrest and for use with headrests of various sizes.

SUMMARY OF THE INVENTION

It is, therefore, an object of the present invention to provide an adjustable headrest for a vehicle. The headrest includes a headrest body and at least one support arm extending downwardly from the headrest body. The support arm is shaped and dimensioned for positioning within the seat back of an automobile. A tilt assembly is positioned within the headrest body. The tilt assembly couples the headrest body to the support arm in a manner permitting relative movement between the headrest body and the support arm. The tilt assembly includes a lower bracket assembly fixedly coupled to the support arm and an upper bracket assembly fixedly coupled to the headrest body. The upper bracket assembly is pivotally coupled to the lower bracket assembly for controlled movement relative thereto. The tilt assembly includes a cam arm permitting actuation thereof between a locked position and a release position, wherein the cam arm may be actuated from either side of the headrest body.

It is also an object of the present invention to provide a headrest wherein a locking member is positioned between the lower bracket assembly and the upper bracket assembly. The locking member includes a latch for selectively releasing and locking the latching member to respectively facilitate movement of the headrest body relative to the support arm and lock the headrest body relative to the support arm.

It is another object of the present invention to provide a headrest wherein the locking member includes an arcuate flange secured to the lower bracket assembly.

It is a further object of the present invention to provide a headrest wherein the arcuate flange includes a series of recesses positioned along the circumference of the flange for selective engagement with a lock slide secured to the upper bracket assembly. The lock slide selectively engages the flange for locking the headrest body relative to the support arm at preselected positions based upon the recesses formed along the circumference of the flange.

It is also another object of the present invention to provide a headrest wherein the cam arm cooperates with the lock slide for actuating the lock slide to release and engage the flange.

It is still another object of the present invention to provide a headrest wherein the cam arm includes a first end and a second end. The first end is positioned substantially along the outer surface of the headrest body for actuation when a user desires to adjust the tilt of his or her headrest. The second end of the cam arm is provided with an angled camming surface formed for mating with a lower surface of the lock slide which includes a similar camming surface formed along both sides of the lock slide allowing for actuation of the lock slide from either side thereof.

It is yet a further object of the present invention to provide a headrest wherein the second end of the cam arm is provided with a length adjustment mechanism permitting use in a variety of headrests regardless of the required distance between the outer surface of the headrest body and the lock slide.

It is also an object of the present invention to provide a headrest wherein the length adjustment mechanism is a series of selectively frangible sections permitting an installer to readily adjust the length of the cam arm by simply breaking off various sections of the frangible section.

It is another object of the present invention to provide a headrest including a first cam arm support secured to the upper bracket assembly for supporting the cam arm.

It is a further object of the present invention to provide a headrest wherein the first cam arm support includes a circularly locking member for receiving and engaging the cam arm as it is passed therethrough.

It is also an object of the present invention to provide a headrest wherein the first cam arm support includes an inwardly facing protrusion shaped and dimensioned to engage an outwardly facing protrusion formed along the outer surface of the cam arm. Both the inwardly facing protrusion and the outwardly facing protrusion include a respective locking surface. The outwardly facing protrusion also includes a tapered surface while the inwardly facing protrusion includes an engaging surface. The tapered surface of the cam arm and the engaging surface of the first cam arm support permit insertion of the cam arm while the locking surfaces of the first cam arm support and the cam arm engage once the cam arm is inserted to prevent withdrawal of the cam arm.

It is also a further object of the present invention to provide a headrest wherein the outwardly facing protrusion of the cam arm is formed on a slide which is slidingly supported upon the cam arm to permit movement of the cam arm relative thereto once the cam arm is locked to the first or second cam arm support.

It is also an object of the present invention to provide a headrest including a second cam arm support secured to the upper bracket assembly for supporting the cam arm, wherein the second cam arm support is positioned opposite the first cam arm support.

It is another object of the present invention to provide a headrest wherein the second cam arm support includes a circularly locking member for receiving and engaging the cam arm as it is passed therethrough.

It is a further object of the present invention to provide a headrest wherein the second cam arm support includes an inwardly facing protrusion shaped and dimensioned to engage an outwardly facing protrusion formed along the outer surface of the cam arm. Both the inwardly facing protrusion and the outwardly facing protrusion include a respective locking surface. The outwardly facing protrusion also includes a tapered surface while the inwardly facing protrusion includes an engaging surface. The tapered surface of the cam arm and the engaging surface of the second cam arm support permit insertion of the cam arm while the locking surfaces of the first cam arm support and the cam arm engage once the cam arm is inserted to prevent withdrawal of the cam arm.

It is also another object of the present invention to provide a headrest wherein the outwardly facing protrusion of the cam arm are formed on a slide which is slidingly supported upon the cam arm to permit movement of the cam arm relative thereto once the cam arm is locked to the first or second cam arm support.

Other objects, advantages and salient features of the invention will become apparent from the following detailed description, which taken in conjunction with the annexed drawings, discloses a preferred, but non-limiting, embodiment of the subject invention.

BRIEF DESCRIPTION OF THE DRAWINGS

FIG. 3 is detailed view of the cam arm, latch and lock slide.

FIG. 4 is a side view of a headrest in accordance with the present invention.

DESCRIPTION OF THE PREFERRED EMBODIMENT

Figure 1:
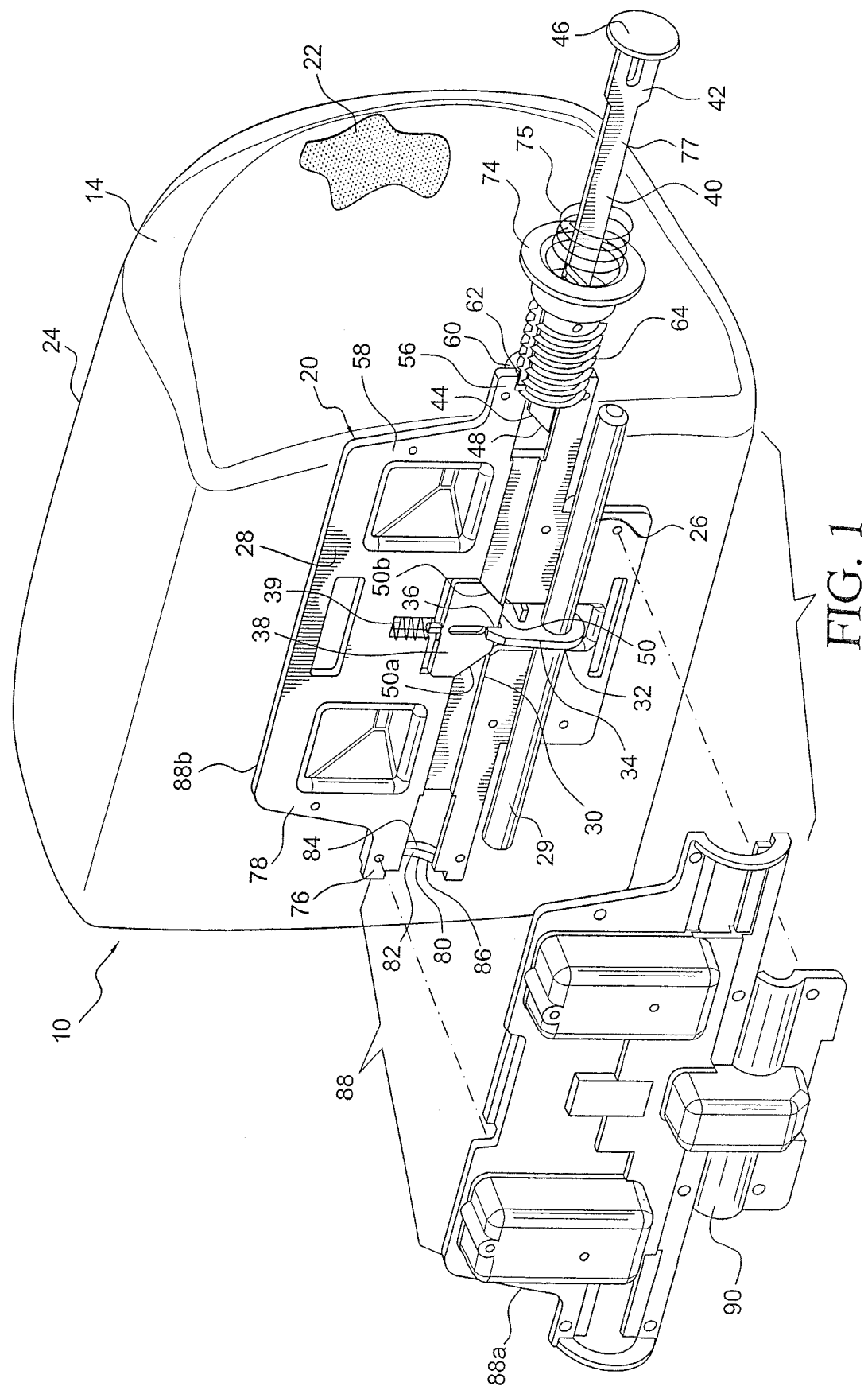
FIG. 1 is an exploded perspective view of a headrest tilting mechanism in accordance with the present invention.
Figure 2:
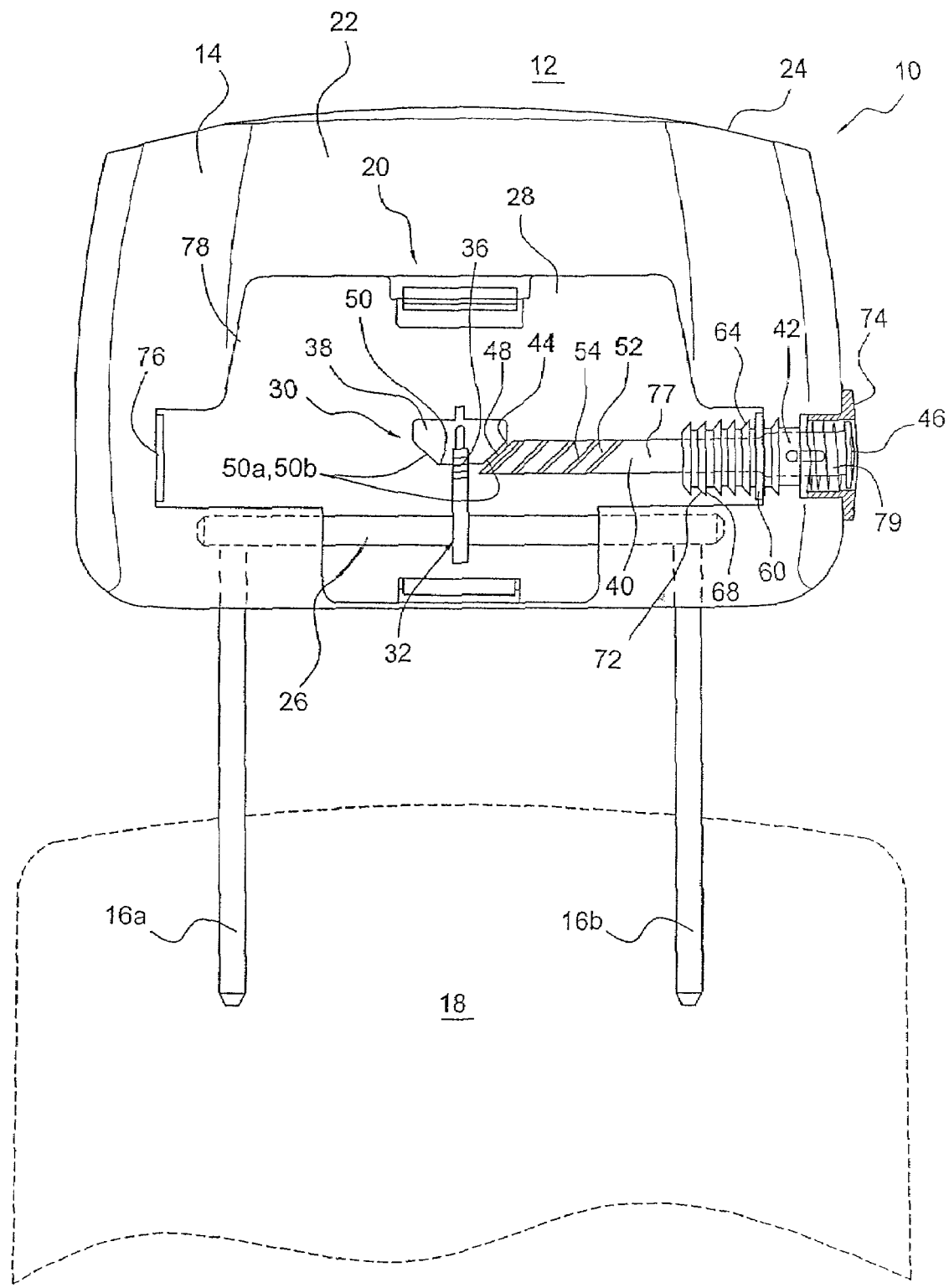
FIG. 2 is a front plan view of the headrest tilting mechanism in accordance with the present invention showing the tilting mechanism within a headrest.
Figure 5:
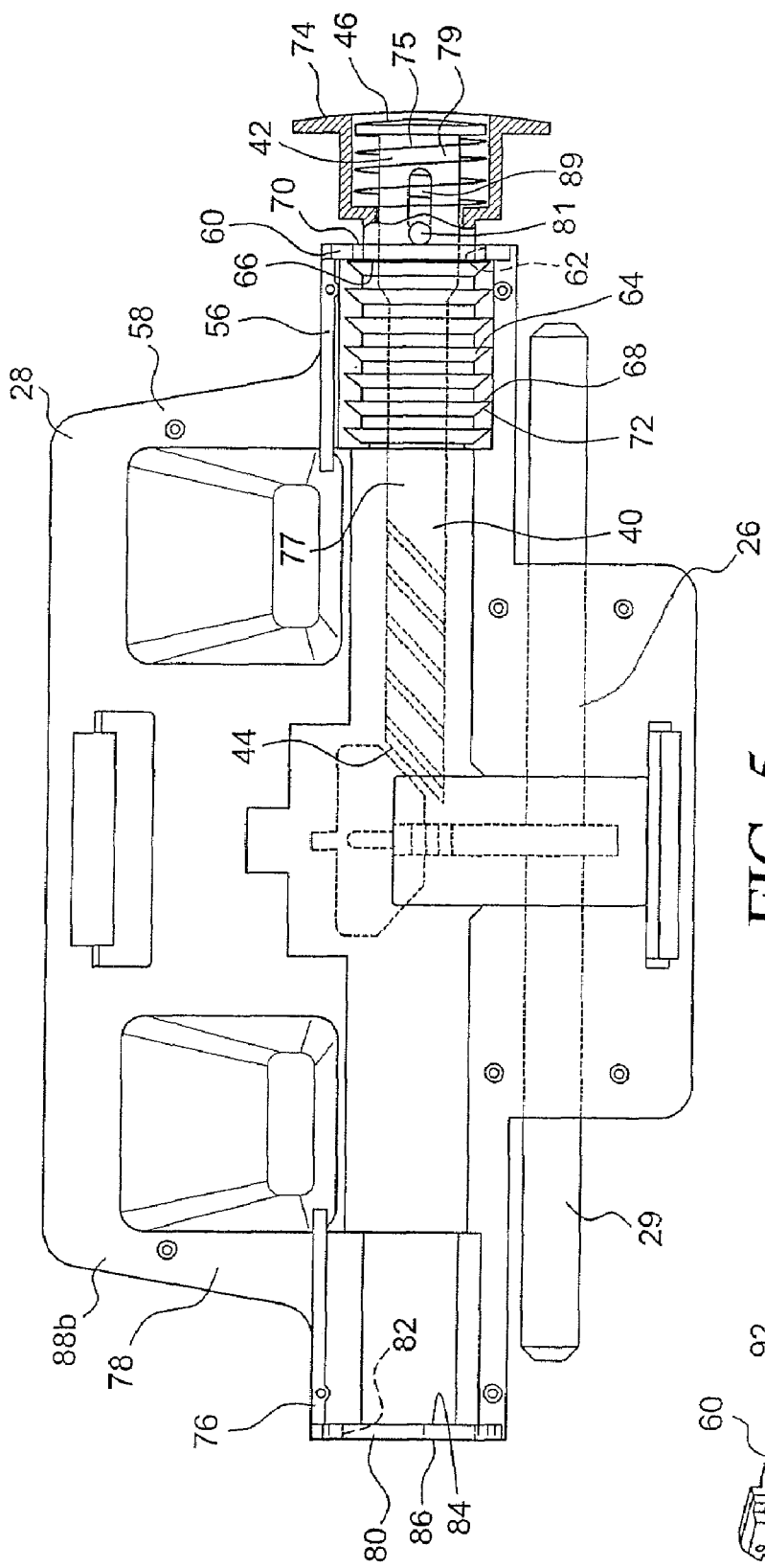
FIG. 5 is a detailed front plan view, in partial cross section, of the upper bracket assembly, lower bracket assembly and cam arm.

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as the basis for the claims and for teaching one skilled in the art how to make and/or use the invention.

With reference to FIGS. 1 to 6, an adjustable headrest 10 for an automobile 12 is disclosed. The headrest 10 includes a headrest body 14 and at least one support arm 16a, 16b extending downwardly from the headrest body 14, the support arm 16a, 16b being shaped and dimensioned for adjustable positioning within the seat back 18 of the automobile 12. A tilt assembly 20 is positioned within the headrest body 14. The tilt assembly 20 couples the headrest body 14 to the support arm 16a, 16b in a manner permitting relative movement between the headrest body 14 and the support arm 16a, 16b.

In accordance with a preferred embodiment of the present invention, the headrest body 14 is a conventional headrest body 14 including a foam core 22 with an outer surface 24 formed of either fabric, leather, vinyl, or other fabrics commonly used within the automobile industry. While the present invention is described for use in conjunction with a headrest designed for an automobile, those skilled in the art will appreciate the concepts underlying the present invention could be readily applied to a variety of vehicles, for example, aircraft and boats, without departing from the spirit of the present invention.

With regard to the support arm 16a, 16b, the headrest 10 is preferably provided with a first support arm 16a and a second support arm 16b. The first and second support arms 16a, 16b are linked to the tilt assembly 20 in a manner permitting relative movement as discussed below in greater detail. However, one or more support arms may be employed in conjunction with the present invention without departing from the spirit thereof. In addition, and as those skilled in the art will certainly appreciate, a variety of support arm structures are known within the art and any of these structures may be employed in accordance with the present invention without departing from the spirit of the present invention.

As will be appreciated based upon the following disclosure, the present tilt assembly 20 allows for right or left handed installation without utilizing different parts. As a result, and as those skilled in the art will certainly appreciate, the present invention allows for use of the same tilt assembly 20 in headrests 10 regardless of whether the headrest 10 is to be positioned on the left or right side of the automobile 12. This is especially important considering the fact that it is desirable for the actuation mechanism for a headrest tilting assembly 20 to be positioned for access toward the center of the automobile 12 and away from the shoulder straps of conventional seatbelts. In addition to providing for either right or left handed installation through the utilization of a single tilt assembly 20, the present tilt assembly 20 allows for use in conjunction with headrest bodies of various sizes.

The tilt assembly 20 includes a lower bracket assembly 26 fixedly coupled to the support arms 16a, 16b and an upper bracket assembly 28 fixedly coupled to the headrest body 14. The upper bracket assembly 28 is pivotally coupled to the lower bracket assembly 26 via a pivot rod 29, which is in turn fixedly connected, for example, by welding, to the support arms 16a, 16b for controlled movement relative thereto. Controlled movement is provided by the positioning of a locking member 30 between the upper bracket assembly 28 and the lower bracket assembly 26.

The upper bracket assembly 28 includes a housing 88 composed of first and second housing members 88a, 88b which are shaped to fit about the actuating components of the present tilt assembly 20. The housing 88 also includes a laterally extending recess 90 in which the pivot rod 29 is positioned in a manner allowing the upper bracket assembly 28 to pivot relative to the lower bracket assembly 26 (that is, generally, the pivot rod 29 and flange 34 of the locking member 30).

The locking member 30 is positioned between the lower bracket assembly 26 and the upper bracket assembly 28. The locking member 30 includes a latch 32 for selectively releasing and locking the locking member 30 to respectively facilitate movement of the headrest body 14 relative to the support arms 16a, 16b and lock the headrest body 14 relative to the support arms 16a, 16b.

More particularly, the locking member 30 includes an arcuate flange 34 forming part of the lower bracket assembly 26. The arcuate flange 34 is fixedly coupled to the pivot rod 29, permitting the upper bracket assembly 28 and the headrest body 14 to pivot in a controlled manner. The arcuate flange 34 includes a series of recesses 36 positioned along the circumference of the flange 34 for selective engagement with a lock slide 38 secured to the upper bracket assembly 28. The lock slide 38 is spring biased via a spring 39 and selectively engages the flange 34 for locking the headrest body 14 relative to the support arms 16a, 16b at preselected positions based upon the recesses 36 formed along the circumference of the flange 34.

In accordance with a preferred embodiment, the arcuate flange 34 covers an arc allowing for adjustment of the headrest body 14 along the same arc. As for the recesses 36, they are positioned at predetermined intervals. As those skilled in the art will certainly appreciate, the specific length of the arc defined by the arcuate flange 34 and the number (and position) of the recesses 36 may certainly be varied to suit specific automobile applications without departing from the spirit of the present invention.

A cam arm 40 cooperates with the lock slide 38. The cam arm 40 actuates the lock slide 38 for movement along a recess 92 formed in the housing 88 to release and engage the flange 34 in a manner selectively freeing the headrest body 14 from the first and second support arms 16a, 16b for permitting movement relative thereto.

The cam arm 40 includes a first end 42 and a second end 44. The first end 42 is positioned substantially along the outer surface 24 of the headrest body 14 for actuation when a user desires to adjust the tilt of his or her headrest 10. With this in mind, the exposed portion of the first end 42 is provided with a button structure 46 shaped and dimensioned for engagement by a user of the automobile 12 and ease of use.

The second end 44 of the cam arm 40 is provided with an angled camming surface 48. The angled camming surface 48 is formed at approximately a 45 degree angle for mating with a lower surface 50 of the lock slide 38 which includes similar first and second camming surfaces 50a, 50b respectively formed along opposite sides of the lower surface 50 of the lock slide 38. As will be appreciated based upon the foregoing disclosure, the provision of first and second camming surfaces 50a, 50b along the lower surface 50 of the lock slide 38 allow for actuation of the lock slide 38 from either side thereof.

The second end 44 of the cam arm 40 is provided with a length adjustment mechanism 52 permitting use in a variety of headrests 10 regardless of the required distance between the outer surface 24 of the headrest body 14 and the lock slide 38. The length adjustment mechanism 52 is a series of selectively frangible sections 54 permitting an installer to readily adjust the length of the cam arm 40 by simply breaking off various sections of the frangible section 54. As the various frangible sections 54 are removed, the camming surface 48 at the second end 44 of the cam arm 40 remains the same and allows for interaction between the second end 44 of the cam arm 40 and the lock slide 38.

The cam arm 40 may be supported along either left or right sides of the headrest 10. With this in mind, a first cam arm support 56 is secured to the left side 58 of the upper bracket assembly 28 for supporting the cam arm 40 relative to the lock slide 38 when the cam arm 40 is to be actuated from the left side of the headrest body 14. The first cam arm support 56 includes a circular lock 60 for receiving and engaging the cam arm 40 as it is passed therethrough. The circular lock 60 of the first cam arm support 56 includes an inwardly facing protrusion 62 shaped and dimensioned to engage outwardly facing protrusions 64 formed along the outer surface of the cam arm 40. Both the inwardly facing protrusion 62 and the outwardly facing protrusions 64 include respective locking surface(s) 66, 68. The inwardly facing protrusion 62 further includes a squared engaging surface 70 and the outwardly facing protrusions 64 include tapered surfaces 72. The tapered surfaces 72 of the cam arm 40 and the engaging surface 70 of the first cam arm support 56 are shaped and dimensioned to permit insertion of the cam arm 40. The locking surface(s) 66, 68 of the first cam arm support 56 and the cam arm 40 are shaped and dimensioned to engage one another once the cam arm 40 is inserted to prevent withdrawal of the cam arm 40 from the upper bracket assembly 28.

The cam arm 40 includes a slide 74 and a rod 77 shaped and dimensioned to move within the slide 74. More particularly, the outwardly facing protrusions 64 of the cam arm 40 are formed on the slide 74 which slidingly supports the remainder of the cam arm 40, that is, the rod 77. This permits movement of the cam arm 40 relative to the first cam arm support 56 once the cam arm 40 is locked to the first cam arm support 56 by engaging the slide 74 with the circular lock 60. The slide 74 and rod 77 are biased by a spring 75 in a manner pushing the first end 42 of the cam arm 40, in particular, the button 46 secured at the first end 79 of the rod 77, toward the outer surface 24 of the headrest body 14 and simultaneously pushing the second end 44 of the cam arm 40 away from the lock slide 38 to ensure the lock slide 38 remains engaged with the arcuate flange 34 unless the cam arm 40 is specifically actuated by pressing the button inwardly 46 such that the second end 44 of the cam arm engages the lock slide 38. The extent of movement of the spring biased cam arm 40, that is, movement of the rod 77 relative to the slide 74, is controlled by a limit pin 81 extending through the slide 74 and interacting with a slot 89 formed in the rod 77.

As the present tilting mechanism is designed for use with a variety of vehicles, the distance from the first cam arm support 56 to the outer surface 24 of the headrest body 14, the slide 74 is provided with a plurality of protrusion 64 along its length. As such, the cam arm 40 may be insert to a desired length (that is, the point at which the first end 42 is substantially flush with the outer surface of the headrest body 14) at which point it is inserted no further and the respective locking surfaces 66, 68 of the cam arm 40 and the first cam arm support 56 engage.

A second cam arm support 76 is secured to the right side 78 of the upper bracket assembly 28 for supporting the cam arm 40 relative to the lock slide 38 when the cam arm 40 is to be actuated from the left side of the headrest body 14. The second cam arm support 78 includes a circular lock 80 for receiving and engaging the cam arm 40 as it is passed therethrough. The second cam arm support 78 includes an inwardly facing protrusions 82 shaped and dimensioned to engage outwardly facing protrusions 64 formed along the outer surface of the cam arm 40. Both the inwardly facing protrusion 82 and the outwardly facing protrusions 64 include respective locking surface(s) 84, 68. The inwardly facing protrusion 82 further includes a squared engaging surface 86 and the outwardly facing protrusions 64 include the tapered surfaces 72. The tapered surfaces 72 of the cam arm 40 and the engaging surface 86 of the second cam arm support 76 are shaped and dimensioned to permit insertion of the cam arm 40. The locking surface(s) 84, 68 of the second cam arm support 76 and the cam arm 40 are shaped and dimensioned to engage one another once the cam arm 40 is inserted to prevent withdrawal of the cam arm 40 from the upper bracket assembly 28.

Figure 6:
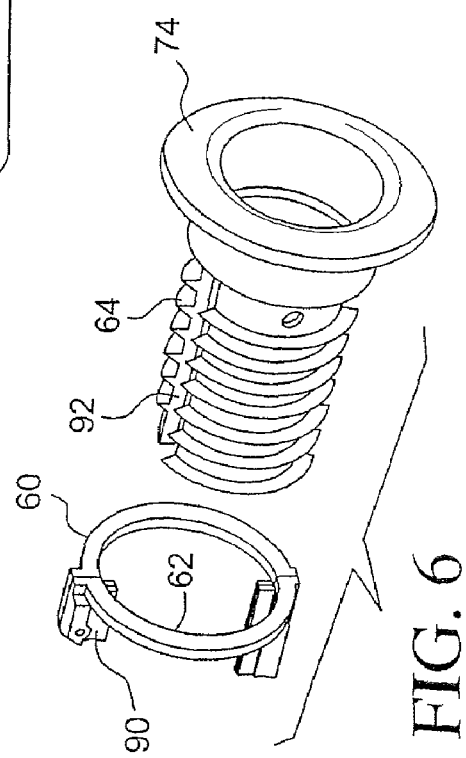
FIG. 6 is an exploded view of the slide and circular lock.

The circular locks 60, 80 are both formed with an inward directed guide member 90 which sits within a slot 92 in the cam arm 40 to ensure proper alignment. Although only the guide member 90 of circular lock 60 of the first cam arm support 56 is shown in FIG. 6, the circular lock 80 of the second cam arm support 78 is provide with a similar guide member.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. An adjustable headrest for a vehicle, comprising:
a headrest body;
at least one support arm extending downwardly from the headrest body, the support arm being shaped and dimensioned for positioning within the seat back of an automobile:
a tilt assembly positioned within the headrest body, the tilt assembly coupling the headrest body to the support arm in a manner permitting relative movement between the headrest body and the support arm;
the tilt assembly including a lower bracket assembly having a pivot rod fixedly coupled to the support arm and an upper bracket assembly fixedly coupled to the headrest body, the upper bracket assembly being pivotally coupled to the pivot rod of the lower bracket assembly for controlled movement relative thereto; and
the tilt assembly includes a cam arm cooperating with a lock slide permitting actuation thereof between a locked position and a release position, wherein the lock slide includes first and second camming surfaces respectively formed along opposite sides of the lock slide allowing the cam arm to actuate the lock slide movement between the locked position and the released position from either a left side or a right side of the headrest body.

2. The headrest according to claim 1, wherein a locking member is positioned between the lower bracket assembly and the upper bracket assembly, the locking member including a latch for selectively releasing and locking the locking member to respectively facilitate movement of the headrest body relative to the support arm and lock the headrest body relative to the support arm.

3. The headrest according to claim 2, wherein the locking member includes an arcuate flange secured to the lower bracket assembly.

4. The headrest according to claim 3, wherein the arcuate flange includes a series of recesses positioned along the circumference of the flange for selective engagement with the lock slide that is secured to the upper bracket assembly, the lock slide selectively engages the flange for locking the headrest body relative to the support arm at preselected positions based upon the recesses formed along the circumference of the flange.

5. The headrest according to claim 4, wherein the cam arm cooperates with the lock slide for actuating the lock slide to release and engage the flange.

6. The headrest according to claim 5, wherein the cam arm includes a first end and a second end, the first end is positioned substantially along the outer surface of the headrest body for actuation when a user desires to adjust the tilt of his or her headrest, the second end of the cam arm is provided with an angled camming surface formed for mating with a lower surface of the lock slide which includes a similar camming surface formed along both sides of the lock slide allowing for actuation of the lock slide from either side thereof.

7. The headrest according to claim 6, wherein the second end of the cam arm is provided with a length adjustment mechanism permitting use in a variety of headrests regardless of the required distance between the outer surface of the headrest body and the lock slide.

8. The headrest according to claim 7, wherein the length adjustment mechanism is a series of selectively frangible sections permitting an installer to readily adjust the length of the cam arm by simply breaking off various sections of the frangible section.

9. The headrest according to claim 1, further including a first cam arm support secured to the upper bracket assembly for supporting the cam arm.

10. The headrest according to claim 9, wherein the first cam arm support includes a circularly locking member for receiving and engaging the cam arm as it is passed therethrough.

11. The headrest according to claim 10, wherein the first cam arm support includes an inwardly facing protrusion shaped and dimensioned to engage an outwardly facing protrusion formed along an outer surface of the cam arm, both the inwardly facing protrusion and the outwardly facing protrusion include a respective locking surface, and the outwardly facing protrusion includes a tapered surface while the inwardly facing protrusion includes an engaging surface, wherein the tapered surface of the cam arm and the engaging surface of the first cam arm support permit insertion of the cam arm while the locking surfaces of the first cam arm support and the cam arm engage once the cam arm is inserted to prevent withdrawal of the cam arm.

12. The headrest according to claim 11, wherein the cam arm includes a slide and a rod shaped and dimensioned to move within the slide, and the outwardly facing protrusion of the cam arm is formed on the slide, and the slide slidingly supports the rod.

13. The headrest according to claim 9, further including a second cam arm support secured to the upper bracket assembly for supporting the cam arm, wherein the second cam arm support is positioned opposite the first cam arm support for selectively supporting the cam arm.

14. The headrest according to claim 13, wherein the second cam arm support includes a circularly locking member for receiving and engaging the cam arm as it is passed therethrough.

15. The headrest according to claim 14, wherein the second cam arm support includes an inwardly facing protrusion shaped and dimensioned to engage the outwardly facing protrusion formed along an outer surface of the cam arm, both the inwardly facing protrusion and the outwardly facing protrusion include a respective locking surface, and the outwardly facing protrusion includes a tapered surface while the inwardly facing protrusion includes an engaging surface, wherein the tapered surface of the cam arm and the engaging surface of the second cam arm support permit insertion of the cam arm while the locking surfaces of the second cam arm support and the cam arm engage once the cam arm is inserted to prevent withdrawal of the cam arm.

16. The headrest according to claim 13, wherein the outwardly facing protrusions of the cain arm are formed on a slide which is slidingly supported upon the cam arm to permit movement of the cam arm relative thereto once the cam arm is locked to the first or second cam arm support.

17. An adjustable headrest for a vehicle, comprising:
a headrest body;
at least one support arm extending downwardly from the headrest body, the support arm being shaped and dimensioned for positioning within the seat back of an automobile:
a tilt assembly positioned within the headrest body, the tilt assembly coupling the headrest body to the support arm in a manner permitting relative movement between the headrest body and the support arm;
the tilt assembly including a lower bracket assembly fixedly coupled to the support arm and an upper bracket assembly fixedly coupled to the headrest body, the upper bracket assembly being pivotally coupled to the lower bracket assembly for controlled movement relative thereto; and the tilt assembly includes a cam arm permitting actuation thereof between a locked position and a release position, wherein the cam arm may be actuated from either side of the headrest body;

wherein a locking member including an arcuate flange secured to the lower bracket assembly is positioned between the lower bracket assembly and the upper bracket assembly, the locking member including a latch for selectively releasing and locking the locking member to respectively facilitate movement of the headrest body relative to the support arm and lock the headrest body relative to the support arm, and wherein the arcuate flange includes a series of recesses positioned along the circumference of the flange for selective engagement with a lock slide that is secured to the upper bracket assembly, the lock slide selectively engages the flange for locking the headrest body relative to the support arm at preselected positions based upon the recesses formed along the circumference of the flange;

the cam arm cooperates with the lock slide for actuating the lock slide to release and engage the flange, and the cam arm includes a first end and a second end, the first end of the cam arm is positioned substantially along the outer surface of the headrest body for actuation when a user desires to adjust the tilt of his or her headrest, the second end of the cam arm is provided with an angled camming surface formed for mating with a lower surface of the lock slide which includes a similar cammming surface formed along both sides of the lock slide allowing for actuation of the lock slide from either side thereof;

the second end of the cam arm is further provided with a length adjustment mechanism composed of a series of selectively frangible sections permitting an installer to readily adjust the length of the cam arm by simply breaking off various sections of the frangible section and permitting use in a variety of headrests regardless of the required distance between the outer surface of the headrest body and the lock slide.

\* \* \* \* \*